United States Patent
Lewis et al.

(10) Patent No.: US 10,227,875 B2
(45) Date of Patent: Mar. 12, 2019

(54) GAS TURBINE ENGINE COMPONENT WITH COMBINED MATE FACE AND PLATFORM COOLING

(71) Applicant: UNITED TECHNOLOGIES CORPORATION, Hartford, CT (US)

(72) Inventors: Scott D. Lewis, Vernon, CT (US); Brandon M. Rapp, West Hartford, CT (US); Jeffrey S. Beattie, South Glastonbury, CT (US); Matthew Andrew Hough, West Hartford, CT (US); Bret M. Teller, Meriden, CT (US); Jeffrey Michael Jacques, East Hartford, CT (US); Max Asterlin, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 451 days.

(21) Appl. No.: 14/766,190

(22) PCT Filed: Feb. 7, 2014

(86) PCT No.: PCT/US2014/015194
§ 371 (c)(1),
(2) Date: Aug. 6, 2015

(87) PCT Pub. No.: WO2014/186005
PCT Pub. Date: Nov. 20, 2014

(65) Prior Publication Data
US 2015/0377032 A1   Dec. 31, 2015

Related U.S. Application Data

(60) Provisional application No. 61/765,179, filed on Feb. 15, 2013.

(51) Int. Cl.
*F01D 5/18* (2006.01)
*F01D 11/08* (2006.01)
(Continued)

(52) U.S. Cl.
CPC ............... *F01D 5/186* (2013.01); *F01D 5/18* (2013.01); *F01D 9/023* (2013.01); *F01D 9/065* (2013.01);
(Continued)

(58) Field of Classification Search
CPC . F01D 5/18; F01D 5/186; F01D 9/023; F01D 9/065; F01D 11/08; F01D 25/12;
(Continued)

(56) References Cited

U.S. PATENT DOCUMENTS 5,382,135 A   1/1995   Green
5,993,150 A   11/1999  Liotta et al.
(Continued)

FOREIGN PATENT DOCUMENTS

EP   0 937 863 A2   8/1999
EP   1849965 A2    10/2007

OTHER PUBLICATIONS

Extended European Search Report for Application No. EP 14 79 7049 dated Aug. 29, 2016.
(Continued)

*Primary Examiner* — Scott Walthour
(74) *Attorney, Agent, or Firm* — Carlson, Gaskey & Olds

(57) ABSTRACT

A component for a gas turbine engine according to an exemplary aspect of the present disclosure includes, among other things, a platform that axially extends between a leading edge and a trailing edge, circumferentially extends between a first mate face and a second mate face, and includes a gas path surface and a non-gas path surface. The component defines at least one cavity that extends at least (Continued)

partially inside of the component. A first plurality of cooling holes extends from the at least one cavity to at least one of the first mate face and the second mate face and a second plurality of cooling holes extends from either the at least one cavity or the non-gas path surface to the gas path surface.

14 Claims, 6 Drawing Sheets

(51) Int. Cl.
| | |
|---|---|
| *F23R 3/00* | (2006.01) |
| *F23R 3/04* | (2006.01) |
| *F01D 9/06* | (2006.01) |
| *F01D 25/12* | (2006.01) |
| *F23R 3/06* | (2006.01) |
| *F01D 9/02* | (2006.01) |
| *F23R 3/02* | (2006.01) |

(52) U.S. Cl.
CPC .............. *F01D 11/08* (2013.01); *F01D 25/12* (2013.01); *F23R 3/002* (2013.01); *F23R 3/02* (2013.01); *F23R 3/04* (2013.01); *F23R 3/06* (2013.01); *F05D 2240/11* (2013.01); *F05D 2240/35* (2013.01); *F05D 2240/81* (2013.01); *F05D 2260/202* (2013.01); *F23R 2900/03041* (2013.01); *F23R 2900/03042* (2013.01); *Y02T 50/675* (2013.01); *Y02T 50/676* (2013.01)

(58) Field of Classification Search
CPC .... F02C 7/28; F05D 2240/11; F05D 2240/35; F05D 2240/81; F05D 2260/202; F23R 3/002; F23R 3/02; F23R 3/04; F23R 3/06; F23R 2900/03041; F23R 2900/03042; Y02T 50/675; Y02T 50/676
See application file for complete search history.

(56) References Cited

U.S. PATENT DOCUMENTS

| | | | |
|---|---|---|---|
| 6,139,258 A | 10/2000 | Lang, III et al. | |
| 6,164,912 A | 12/2000 | Tabbita et al. | |
| 6,190,128 B1 | 2/2001 | Fukuno et al. | |
| 6,190,130 B1 | 2/2001 | Fukue et al. | |
| 6,196,799 B1 | 3/2001 | Fukue et al. | |
| 6,210,111 B1 | 4/2001 | Liang | |
| 6,354,795 B1* | 3/2002 | White ..................... F01D 11/24 415/116 |
| 6,431,833 B2 | 8/2002 | Jones | |
| 6,481,967 B2 | 11/2002 | Tomita et al. | |
| 6,572,335 B2 | 6/2003 | Kuwabara et al. | |
| 6,644,920 B2 | 11/2003 | Beeck et al. | |
| 6,887,033 B1 | 5/2005 | Phillips et al. | |
| 6,945,749 B2 | 9/2005 | DeCardenas | |
| 7,186,089 B2 | 3/2007 | Liang | |
| 7,309,212 B2 | 12/2007 | Itzel et al. | |
| 7,416,391 B2 | 8/2008 | Veltre et al. | |
| 7,431,564 B2 | 10/2008 | Newman | |
| 7,467,922 B2 | 12/2008 | Beeck et al. | |
| 7,600,972 B2 | 10/2009 | Benjamin et al. | |
| 7,625,172 B2 | 12/2009 | Walz et al. | |
| 7,695,247 B1 | 4/2010 | Liang | |
| 8,109,725 B2 | 2/2012 | Abdel-Messeh et al. | |
| 8,133,024 B1 | 3/2012 | Liang | |
| 8,157,527 B2 | 4/2012 | Piggush et al. | |
| 8,206,114 B2 | 6/2012 | Spangler et al. | |
| 2003/0012647 A1* | 1/2003 | Shiozaki ................... F01D 5/18 415/191 |
| 2005/0100437 A1 | 5/2005 | Phillips et al. | |
| 2006/0269409 A1 | 11/2006 | Torii et al. | |
| 2007/0020100 A1 | 1/2007 | Beeck et al. | |
| 2007/0128029 A1* | 6/2007 | Liang ..................... F01D 5/186 416/97 R |
| 2007/0201979 A1* | 8/2007 | Veltre ..................... F01D 5/187 416/97 R |
| 2007/0253816 A1 | 11/2007 | Walz et al. | |
| 2007/0269313 A1 | 11/2007 | Nadvit et al. | |
| 2009/0169368 A1* | 7/2009 | Schlichting ........... F01D 11/122 415/173.1 |
| 2009/0269184 A1 | 10/2009 | Spangler et al. | |
| 2010/0322767 A1 | 12/2010 | Nadvit et al. | |
| 2010/0329888 A1 | 12/2010 | Nadvit et al. | |
| 2011/0044795 A1 | 2/2011 | Chon et al. | |
| 2011/0176929 A1 | 7/2011 | Ammann et al. | |
| 2011/0182724 A1* | 7/2011 | Koyabu ..................... F01D 9/04 415/180 |
| 2011/0186550 A1 | 8/2011 | Gannelli et al. | |
| 2011/0229344 A1 | 9/2011 | Johnson | |
| 2011/0255989 A1* | 10/2011 | Koyabu ................... F01D 11/24 416/97 R |
| 2011/0311369 A1 | 12/2011 | Ramachandran et al. | |
| 2012/0070305 A1 | 3/2012 | Ammann et al. | |
| 2012/0082564 A1* | 4/2012 | Ellis ....................... F01D 5/081 416/97 R |
| 2012/0093649 A1 | 4/2012 | Halfmann et al. | |
| 2012/0107135 A1* | 5/2012 | Harris, Jr. ............... F01D 5/186 416/97 R |
| 2012/0121415 A1 | 5/2012 | Brittingham et al. | |
| 2012/0189424 A1 | 7/2012 | Propheter-Hinckley et al. | |
| 2013/0051972 A1* | 2/2013 | Romanov ............... F01D 11/08 415/1 |
| 2013/0115059 A1* | 5/2013 | Walunj .................. F01D 5/081 415/176 |
| 2013/0115102 A1* | 5/2013 | Walunj .................. F01D 5/186 416/97 R |
| 2013/0171003 A1* | 7/2013 | Ellis ....................... F01D 5/187 416/97 R |
| 2013/0171004 A1* | 7/2013 | Ellis ....................... F01D 5/187 416/97 R |
| 2014/0003961 A1* | 1/2014 | Willey ................... F01D 5/187 416/97 R |
| 2014/0321961 A1* | 10/2014 | Beattie .................. F01D 5/081 415/1 |

OTHER PUBLICATIONS

International Search Report and Written Opinion of the International Searching Authority for International application No. PCT/US2014/015194 dated Dec. 11, 2014.

International Preliminary Report on Patentability for International application No. PCT/US2014/015194 dated Aug. 27, 2015.

* cited by examiner

GAS TURBINE ENGINE COMPONENT WITH COMBINED MATE FACE AND PLATFORM COOLING

BACKGROUND

This disclosure relates to a gas turbine engine, and more particularly to a gas turbine engine component having a combined mate face and platform cooling arrangement.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Various components of a gas turbine engine, including but not limited to blades, vanes and blade outer air seals (BOAS), may be subjected to repetitive thermal cycling under widely ranging temperatures and pressures. Components that operate in these conditions are therefore susceptible to oxidation, thermal mechanical fatigue and gas ingestion that can negatively impact the operative life of these components. Components are often cooled by a dedicated cooling airflow in an effort to offset these conditions.

SUMMARY

A component for a gas turbine engine according to an exemplary aspect of the present disclosure includes, among other things, a platform that axially extends between a leading edge and a trailing edge, circumferentially extends between a first mate face and a second mate face, and includes a gas path surface and a non-gas path surface. The component defines at least one cavity that extends at least partially inside of the component. A first plurality of cooling holes extends from the at least one cavity to at least one of the first mate face and the second mate face and a second plurality of cooling holes extends from either the at least one cavity or a non-gas path surface to at least one gas path surface.

In a further non-limiting embodiment of the foregoing component for a gas turbine engine, the platform is part of a blade.

In a further non-limiting embodiment of either of the foregoing components for a gas turbine engine, the platform is part of a vane.

In a further non-limiting embodiment of any of the foregoing components for a gas turbine engine, the platform is part of a blade outer air seal (BOAS).

Nom In a further non-limiting embodiment of any of the foregoing components for a gas turbine engine, the first plurality of cooling holes are round holes.

In a further non-limiting embodiment of any of the foregoing components for a gas turbine engine, a first cavity and a second cavity extend inside of the component. A first portion of each of the first plurality of cooling holes and the second plurality of cooling holes are in fluid communication with the first cavity and a second portion of each of the first plurality of cooling holes and the second plurality of cooling holes are in fluid communication with the second cavity.

In a further non-limiting embodiment of any of the foregoing components for a gas turbine engine, a first portion of the first plurality of cooling holes is disposed at a first axial region of a pressure side mate face and a second portion of the first plurality of cooling holes is disposed at a second axial region of the pressure side mate face.

In a further non-limiting embodiment of any of the foregoing components for a gas turbine engine, the second plurality of cooling holes are disposed between the first portion and the second portion of the first plurality of cooling holes.

In a further non-limiting embodiment of any of the foregoing components for a gas turbine engine, each of the first plurality of cooling holes and the second plurality of cooling holes are located adjacent a pressure side of the platform.

In a further non-limiting embodiment of any of the foregoing components for a gas turbine engine, at least one cooling hole of the first plurality of cooling holes includes a greater diameter than the remaining cooling holes of the first plurality of cooling holes.

In a further non-limiting embodiment of any of the foregoing components for a gas turbine engine, an outlet portion of the second plurality of cooling holes include a diffusion angle of between 5 and 15 degrees.

In a further non-limiting embodiment of any of the foregoing components for a gas turbine engine, at least one cooling hole of the first plurality of cooling holes is disposed at a position that is about 20% to 30% of an axial length of the first mate face.

A gas turbine engine according to an exemplary aspect of the present disclosure includes, among other things, a compressor section, a combustor section in fluid communication with the compressor section, a turbine section in fluid communication the combustor section and a component positioned within at least one of the compressor section and the turbine section. The component includes a platform that axially extends between a leading edge and a trailing edge, circumferentially extends between a first mate face and a second mate face, and includes at least one gas path surface and at least one non-gas path surface. The component defines at least one cavity that extends at least partially inside of the component. A first plurality of cooling holes extends through at least one of the first mate face and the second mate face and a second plurality of cooling holes extends to the at least one gas path surface.

In a further non-limiting embodiment of the forging gas turbine engine, the component is a turbine blade.

In a further non-limiting embodiment of either of the foregoing gas turbine engines, the second plurality of cooling holes are disposed between a first portion and a second portion of the first plurality of cooling holes.

In a further non-limiting embodiment of any of the foregoing gas turbine engines, the at least one cavity includes a first cavity and a second cavity and a first portion of the first plurality of cooling holes extend from the first cavity and a second portion of the first plurality of cooling holes extend from the second cavity.

A method of cooling a component of a gas turbine engine according to another exemplary aspect of the present disclosure including, among other things, circulating a cooling airflow through a cavity of the component, directing a first portion of the cooling airflow into a first plurality of cooling holes that extend from the cavity to a mate face of the component and directing a second portion of the cooling airflow into a second plurality of cooling holes that extend from the cavity or a non-gas path surface to a gas path surface of the component.

In a further non-limiting embodiment of the foregoing method of cooling a component of a gas turbine engine, the method includes expelling the first portion of the cooling airflow from the first plurality of cooling holes such that the first portion of the cooling airflow impinges on a second component.

In a further non-limiting embodiment of either of the foregoing methods of cooling a component of a gas turbine engine, the method includes blocking hot combustion gases from a core flow path of the gas turbine engine from ingestion into the mate face with the second portion of the cooling airflow.

In a further non-limiting embodiment of any of the foregoing methods of cooling a component of a gas turbine engine, the second plurality of cooling holes are disposed between a first portion and a second portion of the first plurality of cooling holes.

The various features and advantages of this disclosure will become apparent to those skilled in the art from the following detailed description. The drawings that accompany the detailed description can be briefly described as follows.

DETAILED DESCRIPTION

Figure 1:
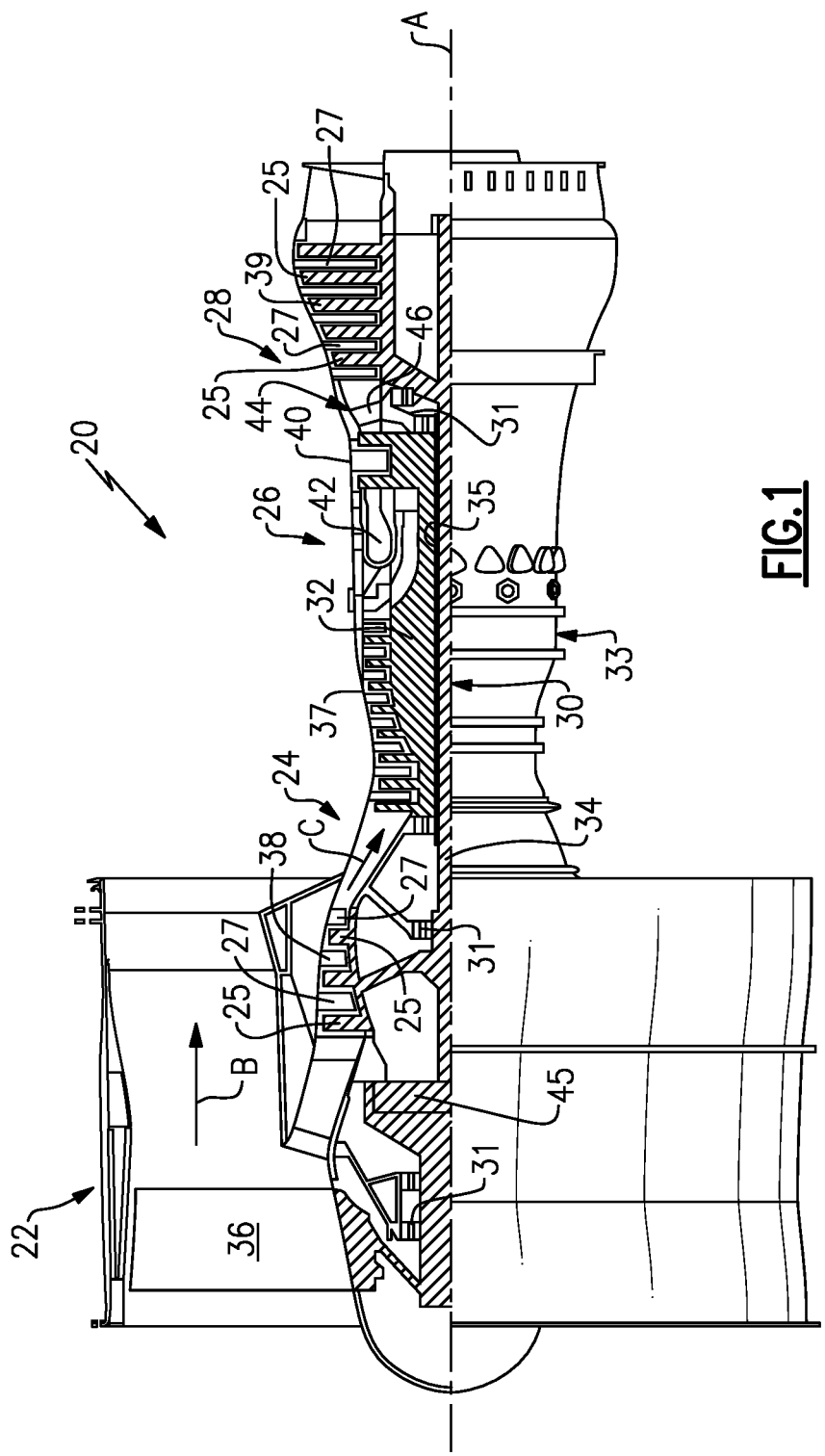
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure)

from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling arrangements for cooling the parts during engine operation. Example cooling arrangements that provide combined mate face and platform cooling are discussed below.

Figure 2:
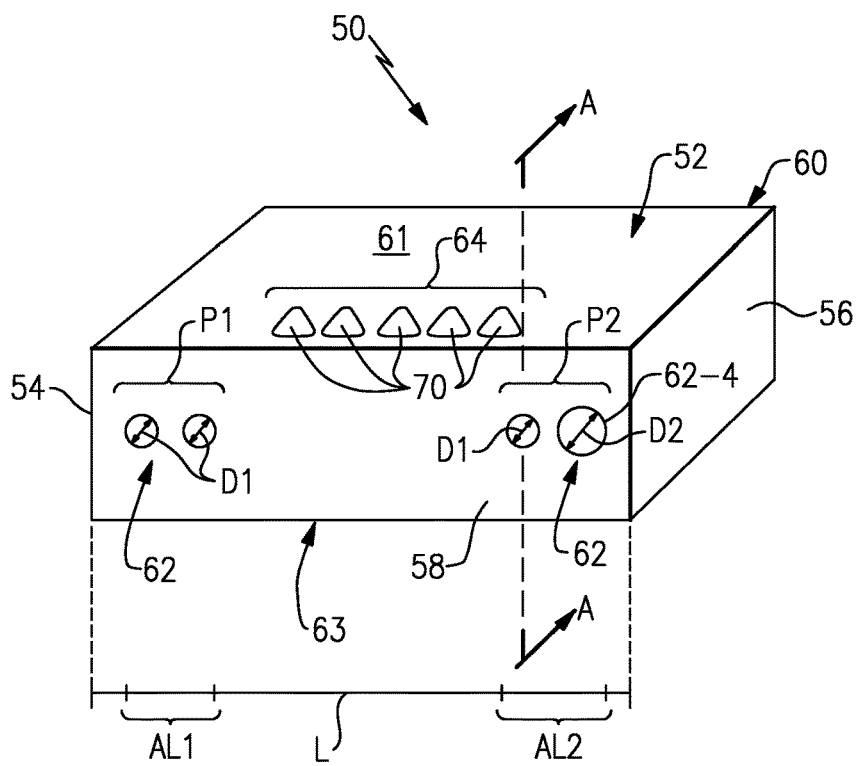
FIG. 2 illustrates a component that can be incorporated into a gas turbine engine.

FIG. 2 is a highly schematic depiction of a component 50 that can be incorporated into a gas turbine engine, such as the gas turbine engine 20 of FIG. 1. The component 50 could be representative of any component that extends into, or has a surface that extends into, the core flow path C (see FIG. 1), including but not limited to blades, vanes and/or BOAS of the compressor section 24 and/or the turbine section 28. It should be understood that the teachings of this disclosure could further extend to any other hardware of the gas turbine engine 20 that may require dedicated cooling as a result of exposure to relatively extreme operating conditions during engine operation.

In this exemplary embodiment, the component 50 includes a platform 52. Although not shown, the component 50 could include additional parts, sections or portions that extend from or cooperate with the platform 52. In this disclosure, the term "platform" is intended to include any portion of a component that has a surface that is exposed to the core flow path C. For example, as described below, the platform 52 could be part of a turbine blade (see FIGS. 4-6).

The platform 52 axially extends between a leading edge 54 and a trailing edge 56 and can circumferentially extend between a first mate face 58 and a second mate face 60. The platform 52 also includes a gas path surface 61 and a non-gas path surface 63. The gas path surface 61 is generally positioned within the core flow path C whereas the non-gas path surface is remote from (i.e., not in direct fluid communication with) the hot combustion gases that are communicated through the core flow path C.

The component 50 of this embodiment includes a cooling arrangement that provides combined mate face and platform cooling. A first plurality of cooling holes 62 may be disposed through at least one of the first mate face 58 and the second mate face 60 and a second plurality of cooling holes 64 may be disposed through at least one of the gas path surface 61 and the non-gas path surface 63 of the platform 52. The number of cooling holes that make up the first and second pluralities of cooling holes 62, 64 is design specific and can vary depending on the cooling requirements of the component 50, among other parameters. The first plurality of cooling holes 62 are designed to block ingestion of hot combustion gases from the core flow path C at the first and/or second mate faces 58, 60 and the second plurality of cooling holes 64 are designed to limit detrimental effects at any secondary ingestion regions. The cooling air provided by the second plurality of cooling holes 64 provides a buffer zone between the air at the mate faces 58, 60 and the hot combustion gases to ensure that when gas path air ingests into the mate faces 58, 60, in the secondary ingestion regions, the coolant air from the second plurality of cooling holes 64 is ingested instead of the hot combustion gases.

In this particular embodiment, the first plurality of cooling holes 62 have a constant round cross-section as viewed normal to the centerline of the hole and exit through the first mate face 58 (here, at the pressure side mate face) and the second plurality of cooling holes 64 are diffusion shaped holes that exit through the gas path surface 61 on a pressure side of the component 50. Diffusion shaped holes may include a constant round cross-section (as viewed normal to the centerline of the hole) on the upstream portion of the hole, but diffuse outwardly on the downstream portion of the hole. This area increase (or diffusion) at the downstream portion of the hole slows down the coolant and allows the coolant film to ride smoothly on the downstream surface as opposed to shooting into the gas path air. This disclosure is not intended to be limited to the exact arrangement and placement illustrated by FIG. 2.

The first plurality of cooling holes 62 may be disposed along an axial length L of the first mate face 58. In one embodiment, a first portion P1 of the first plurality of cooling holes 62 are positioned at a first axial region AL1 of the axial length L and a second portion P2 of the first plurality of cooling holes 62 are positioned at a second, different axial region AL2 of the axial length L. The second plurality of cooling holes 64 can be positioned between the first portion P1 and the second portion P2 of the first plurality of cooling holes 62. In one embodiment, the first axial region AL1 is located at approximately 20% to 30% of the axial length L and the second axial region AL2 is located near the trailing edge 56 of the platform 52. However, the first plurality of cooling holes 62 can be positioned at gas path ingestion regions that may occur anywhere along the axial length L.

In yet another embodiment, at least one of the first plurality of cooling holes 62 includes a diameter D2 that is at least twice the size of the diameters D1 of the remaining cooling holes of the first plurality of cooling holes 62. For example, the aftmost cooling hole 62-4 may include the diameter D2 that is at least twice the diameter of the other cooling holes of the first plurality of cooling holes 62.

The second plurality of cooling holes 64 can include an increasing diameter toward an outlet portion 70 of each cooling hole 64. In one embodiment, the outlet portions 70 of each of the second plurality of cooling holes 64 include a diffusion angle of between 5 and 15 degrees.

Figure 3:
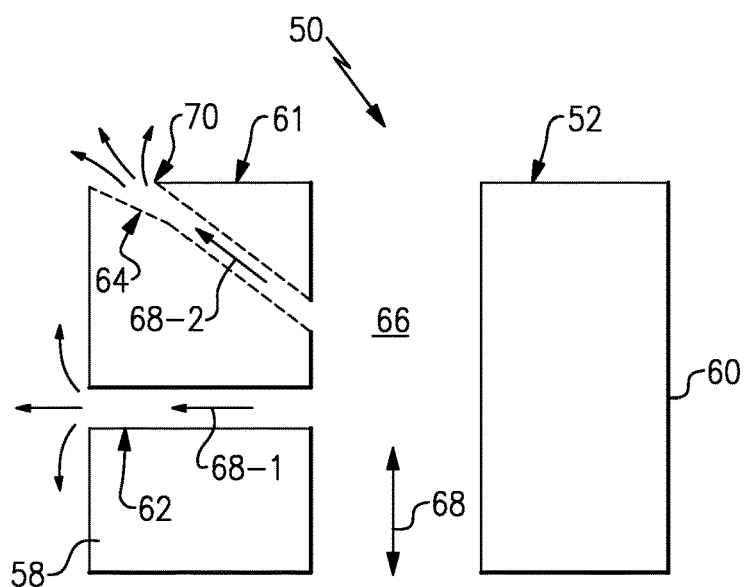
FIG. 3 illustrates a cross-sectional view through section A-A of FIG. 2.

Referring to FIG. 3, the first plurality of cooling holes 62 and the second plurality of cooling holes 64 may be in fluid communication with at least one cavity 66 that extends inside of, or partially through, the component 50. The cavity 66 does not necessarily have to be completely inside of the platform 52 and could extend within other sections of the component. The cooling holes 62, 64 may intersect the cavity 66. In this non-limiting embodiment, the first plurality of cooling holes 62 extend between the cavity 66 and the first mate face 58 and the second plurality of cooling holes 64 extend between the cavity 66 and the gas path surface 61. Although shown as linear passages, the cooling holes 62, 64 could embody other orientation, including orientations with curved portions. In addition, the cooling holes 62, 64 could be oriented to include upstream or downstream vector components relative to the cavity 66 or could extend generally perpendicular to the cavity 66. The cooling holes 64 could alternatively extend from the non-gas path surface 63 of the component 50.

Cooling airflow 68, such as a bleed airflow sourced from the compressor section 24 or any other portion of the gas turbine engine 20, can be circulated through the cavity 66 to cool the internal surfaces of the component 50. Portions 68-1 of the cooling airflow 68 can be extracted from the cavity 66 and directed through the first plurality of cooling holes 62. The portions 68-1 of the cooling airflow 68 are expelled from the first plurality of cooling holes 62 to cool the first mate face 58 as well as impinge upon a mate face of a circumferentially adjacent component. Other portions 68-2 of the cooling airflow 68 can be directed into the second plurality of cooling holes 64 from the cavity 66. The portions 68-2 of the cooling airflow 68 block the hot combustion gases of the core flow path C from further ingestion at the mate face 58 after being expelled from the outlet portions 70 of the second plurality of cooling holes 64.

Figure 4A:
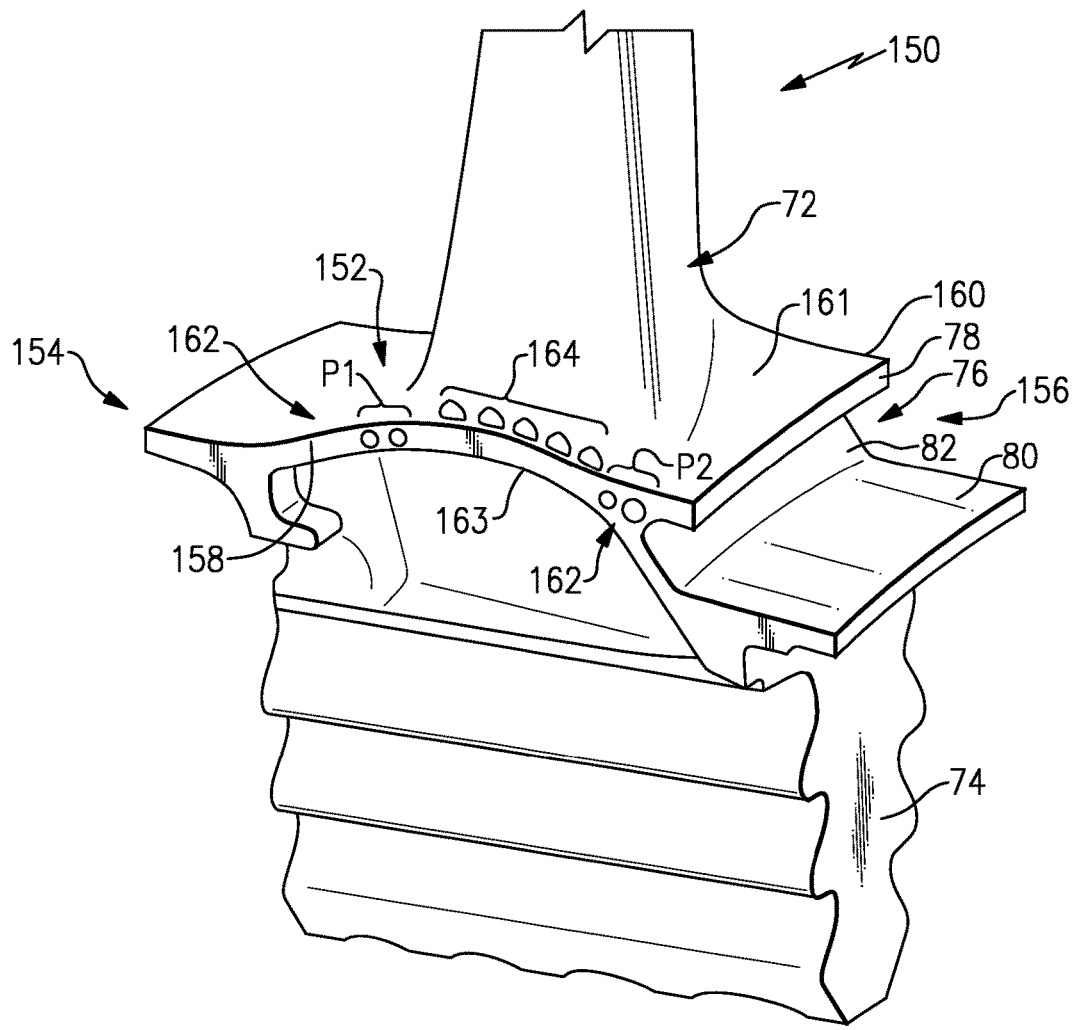
FIGS. 4A and 4B illustrate another exemplary component that can be incorporated into a gas turbine engine.
Figure 4B:
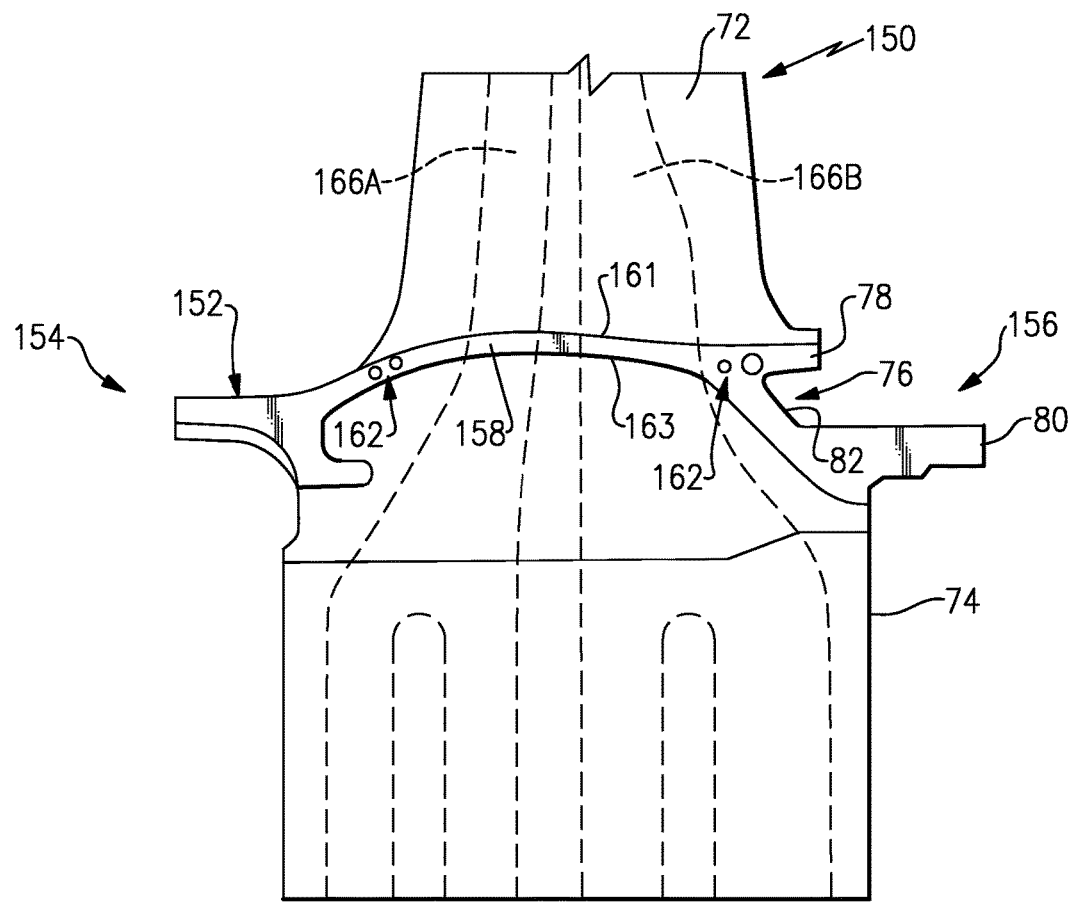

FIGS. 4A and 4B illustrates another exemplary component 150 that can be incorporated into the gas turbine engine 20. In this disclosure, like reference numerals represent like features, whereas reference numerals modified by 100 are indicative of slightly modified features. In this particular embodiment, the component 150 represents a blade, such as a turbine blade. However, the teachings of this disclosure are not limited to turbine blades.

The component 150 includes a platform 152, an airfoil 72 that extends from a gas path surface 161 the platform 152, and a root portion 74 that extends from a non-gas path surface 163 of the platform 152. The platform 152 axially extends between a leading edge 154 and a trailing edge 156 and circumferentially extends between a pressure side mate face 158 and a suction side mate face 160.

The platform 152 may optionally include a channel 76. The channel 76 includes a first flange 78, a second flange 80 and a wall 82 that extends between the first flange 78 and the second flange 80. The channel 76 of this embodiment is positioned adjacent to the trailing edge 156 of the component 150.

The component 150 includes a cooling arrangement that includes a first plurality of cooling holes 162 and a second plurality of cooling holes 164 that provide combined mate face and platform cooling. The first plurality of cooling holes 162 are disposed on the pressure side mate face 158 of the platform 152, and the second plurality of cooling holes 164 are disposed on the gas path surface 161 of the platform 152. The first plurality of cooling holes 162 can include a first portion P1 of cooling holes and a second portion P2 of cooling holes. The second plurality of cooling holes 164 can be positioned between the first portion P1 and the second portion P2 of the first plurality of cooling holes 162.

Referring to FIG. 4B, the component 150 includes a first cavity 166A and a second cavity 166B that are located inside of the component 150. The component could include a greater number of cavities or only a single cavity. The first cavity 166A and the second cavity 166B extend through portions of the root portion 74, the platform 152 and the airfoil 72 and communicate cooling airflow to cool the component 150.

Figure 5:
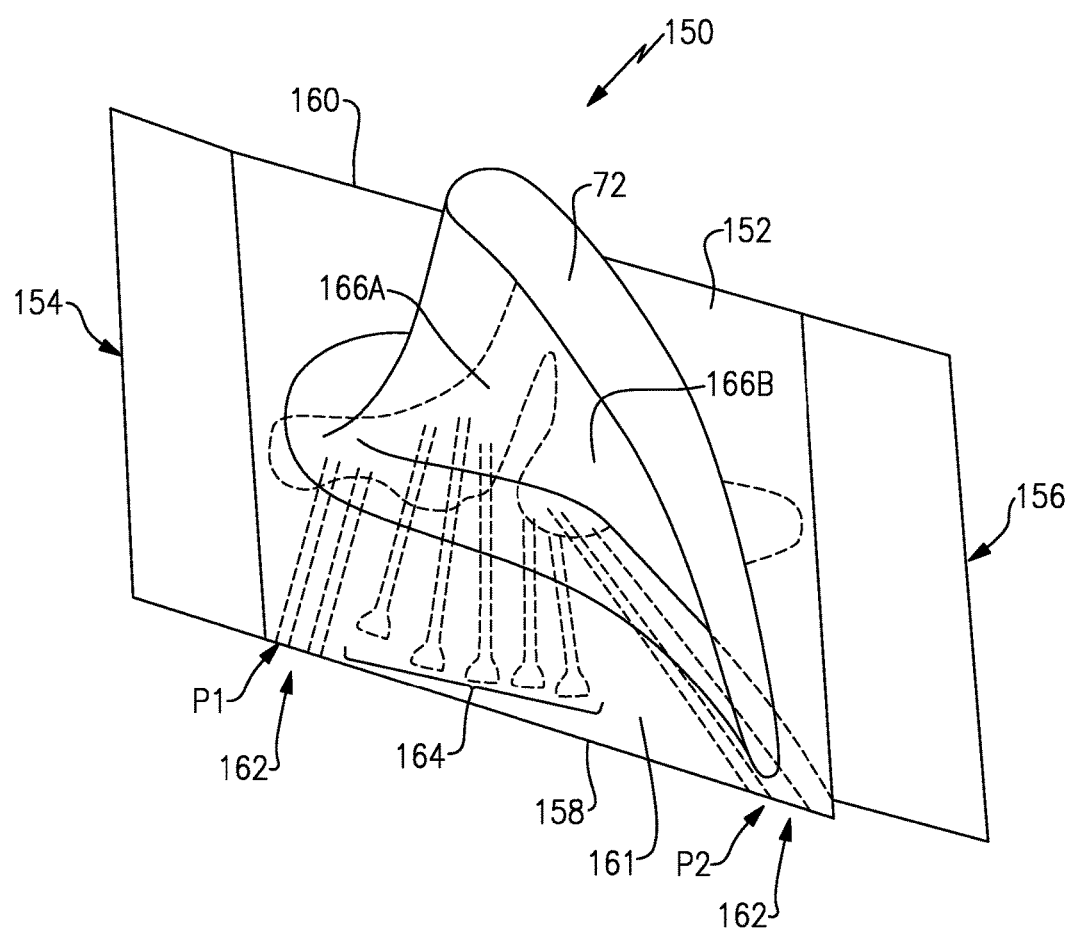
FIG. 5 illustrates an exemplary orientation of a plurality of cooling holes that can be incorporated into a component.

Referring to FIG. 5, the first plurality of cooling holes 162 and the second plurality of cooling holes 164 are in fluid communication with at least one of the first cavity 166A and the second cavity 166B. The cooling holes 162, 164 may intersect the cavities 166A, 166B. In this non-limiting embodiment, the first portion P1 of the first plurality of cooling holes 162 extend between the cavity 166A and the pressure side mate face 158 and the second portion P2 of the first plurality of cooling holes 162 extend between the cavity 166B and the pressure side mate face 158. The second plurality of cooling holes 164 may extend between one of the cavities 166A, 166B and the gas path surface 161.

Figure 6:
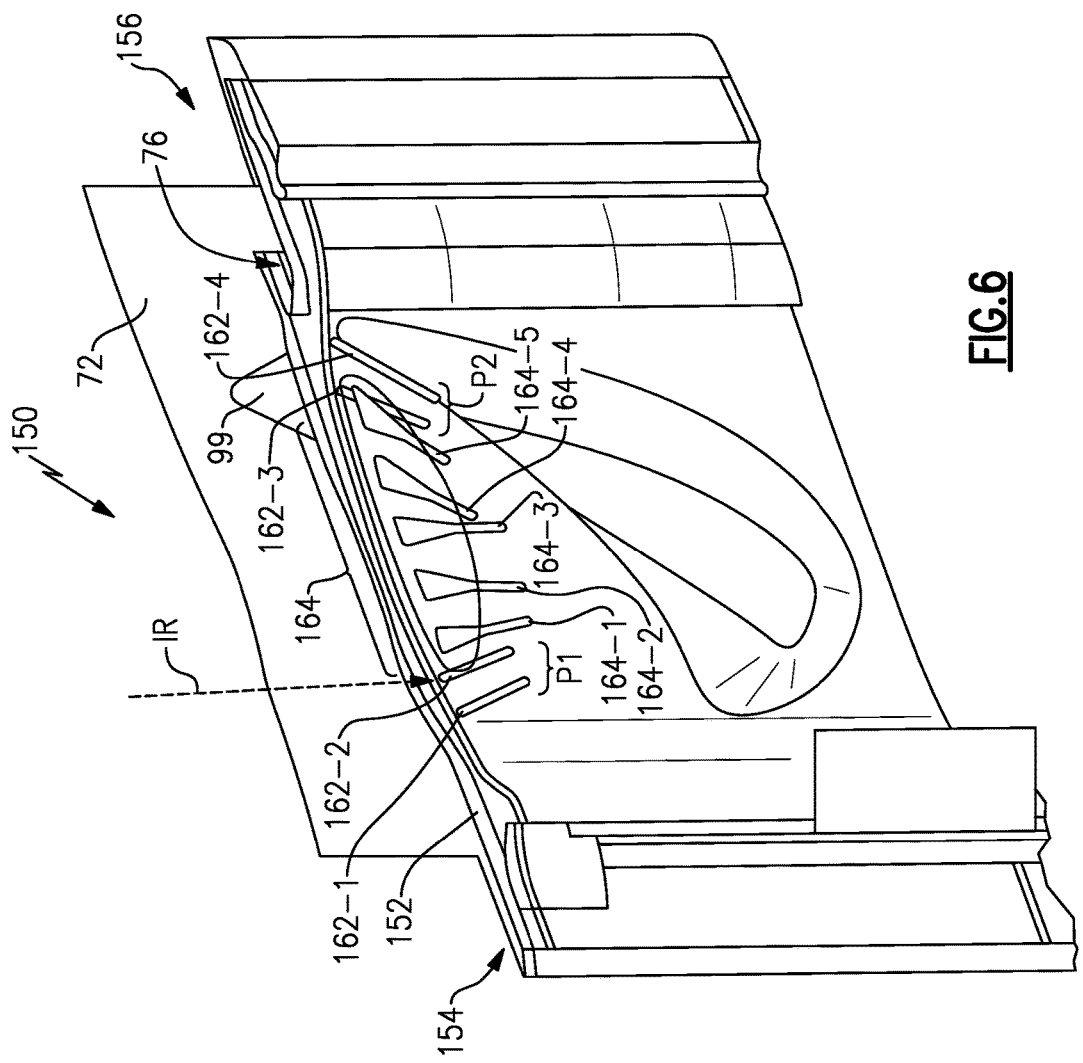
FIG. 6 illustrates an exemplary cooling arrangement of a component.

FIG. 6 illustrates one non-limiting embodiment of a cooling arrangement that can be incorporated into the component 150. In this embodiment, the first portion P1 of the first plurality of cooling holes 162 includes two mate face cooling holes 162-1 and 162-2 that are positioned adjacent to the leading edge 154 of the platform 152. The mate face cooling hole 162-1 is placed just upstream of a gas path ingestion region IR and the mate face cooling hole 162-2 is placed immediately at the gas path ingestion region IR, in this embodiment.

The second portion P2 of the first plurality of cooling holes 162 includes an additional two mate face cooling holes 162-3 and 162-4 that are positioned adjacent to the trailing edge 156. In one embodiment, the mate face cooling holes 162-3 and 162-4 are positioned just downstream of a trailing edge 99 of the airfoil 72. In another example, the cooling holes 162-3 and 162-4 are positioned just upstream from the channel 76. In yet another embodiment, a diameter of the cooling hole 162-4 is at least twice the size of a diameter of the cooling holes 162-1, 162-2, and 162-3.

The second plurality of cooling holes 164 of this exemplary cooling arrangement includes five platform shaped cooling holes 164-1, 164-2, 164-3, 164-4 and 164-5 that are generally disposed between the first portion P1 and the second portion P2 of the first plurality of cooling holes 162. Each of the platform shaped cooling holes 164-1, 164-2, 164-3, 164-4 and 164-5 of this embodiment are positioned on a pressure side of the component.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
   a platform that axially extends between a leading edge and a trailing edge, circumferentially extends between a first mate face and a second mate face, and includes at least one gas path surface and at least one non-gas path surface;
   said component defining at least one cavity that extends at least partially inside an airfoil of the component;
   a first plurality of cooling holes extending from said at least one cavity to one of said first mate face and said second mate face; and
   a second plurality of cooling holes extending to said at least one gas path surface from either said at least one cavity or said at least one non-gas path surface, wherein said second plurality of cooling holes is spaced from an edge of said at least one gas path surface, said edge extending along an intersection of said at least one gas path surface and said one of said first mate face and said second mate face;
   wherein said first plurality of cooling holes consists of four cooling holes;

wherein said second plurality of cooling holes consists of five cooling holes;
wherein a first set of two cooling holes of said first plurality of cooling holes is positioned at a first axial region of said one of said first mate face and said second mate face;
wherein a second set of two cooling holes of said first plurality of cooling holes is positioned at a second axial region of said one of said first mate face and said second mate face; and
wherein said second plurality of cooling holes is disposed between said first set of two cooling holes of said first plurality of cooling holes and said second set of two cooling holes of said first plurality of cooling holes.

2. The component as recited in claim 1, wherein said platform is part of a blade.

3. The component as recited in claim 1, wherein said platform is part of a vane.

4. The component as recited in claim 1, wherein said first plurality of cooling holes are round holes.

5. The component as recited in claim 1, wherein the at least one cavity includes a first cavity and a second cavity that each extend inside of the component, wherein a first portion of each of said first plurality of cooling holes and a first portion of each of said second plurality of cooling holes are in fluid communication with said first cavity and wherein a second portion of each of said first plurality of cooling holes and a second portion of each of said second plurality of cooling holes are in fluid communication with either said second cavity or said at least one non-gas path surface.

6. The component as recited in claim 1, wherein each of said first plurality of cooling holes and each of said second plurality of cooling holes are located adjacent a pressure side of said platform.

7. The component as recited in claim 1, wherein at least one cooling hole of said first plurality of cooling holes includes a greater diameter than the remaining cooling holes of said first plurality of cooling holes.

8. The component as recited in claim 1, wherein respective outlet portions of said second plurality of cooling holes include a diffusion angle of between 5 and 15 degrees.

9. The component as recited in claim 1, wherein at least one cooling hole of said first plurality of cooling holes is positioned at a distance from the leading edge of the platform, the distance being 20% to 30% of an axial length of said first mate face.

10. The component as recited in claim 1, wherein said first plurality of cooling holes include a first cooling hole and a second cooling hole, each of the first cooling hole and the second cooling hole being positioned adjacent to said leading edge of said platform.

11. The component as recited in claim 10, wherein said first cooling hole is positioned upstream of a gas path ingestion region of the component and said second cooling hole is positioned at said gas path ingestion region.

12. A component for a gas turbine engine, comprising:
a platform that extends axially between a leading edge and a trailing edge, circumferentially extends between a first mate face and a second mate face, and includes a gas path surface and a non-gas path surface;
a first cavity and a second cavity each extending inside the component;
a first plurality of cooling holes extending to one of said first mate face and said second mate face; and
a second plurality of cooling holes extending to said gas path surface, wherein said second plurality of cooling holes is spaced from an edge of said gas path surface, said edge extending along an intersection of said gas path surface with said one of said first mate face and said second mate face;
wherein a first portion of each of said first plurality of cooling holes and a first portion of each of said second plurality of cooling holes are connected to said first cavity, and wherein a second portion of each of said first plurality of cooling holes and a second portion of each of said second plurality of cooling holes are connected to either said second cavity or said non-gas path surface;
wherein said first plurality of cooling holes consists of four cooling holes;
wherein said second plurality of cooling holes consists of five cooling holes;
wherein a first set of two cooling holes of said first plurality of cooling holes is positioned at a first axial region of said one of said first mate face and said second mate face;
wherein a second set of two cooling holes of said first plurality of cooling holes is positioned at a second axial region of said one of said first mate face and said second mate face; and
wherein said second plurality of cooling holes is disposed between said first set of two cooling holes of said first plurality of cooling holes and said second set of two cooling holes of said first plurality of cooling holes.

13. A gas turbine engine, comprising:
a compressor section;
a combustor section in fluid communication with said compressor section;
a turbine section in fluid communication with said combustor section;
a component positioned within one of said compressor section and said turbine section, wherein said component includes:
a platform that extends axially between a leading edge and a trailing edge, circumferentially extends between a first mate face and a second mate face, and includes a gas path surface and a non-gas path surface;
a first cavity and a second cavity each extending inside the component;
a first plurality of cooling holes extending to one of said first mate face and said second mate face; and
a second plurality of cooling holes extending to said gas path surface, wherein said second plurality of cooling holes is spaced from an edge of said gas path surface, said edge extending alone an intersection of said gas path surface with said one of said first mate face and said second mate face;
wherein a first portion of each of said first plurality of cooling holes and a first portion of each of said second plurality of cooling holes are connected to said first cavity, and wherein a second portion of each of said first plurality of cooling holes and a second portion of each of said second plurality of cooling holes are connected to either said second cavity or said non-gas path surface;
wherein said first plurality cooling holes consists of four cooling holes;
wherein said second plurality of cooling holes consists of five cooling holes;
wherein a first set of two cooling holes of said first plurality of cooling holes is positioned at a first axial region of said one of said first mate face and said second mate face; positioned at a second axial region of said one of said first mate face and said second mate face; and wherein said second plurality of cooling holes is disposed between said first set of two cooling holes of said first plurality of cooling hoes and said second set of two cooling holes of sad first plurality of cooling holes.

14. The gas turbine engine as recited in claim 13, wherein said component is a turbine blade.

* * * * *